June 4, 1935.    H. A. DE VRY    2,003,480
STEREOSCOPE
Filed July 10, 1933
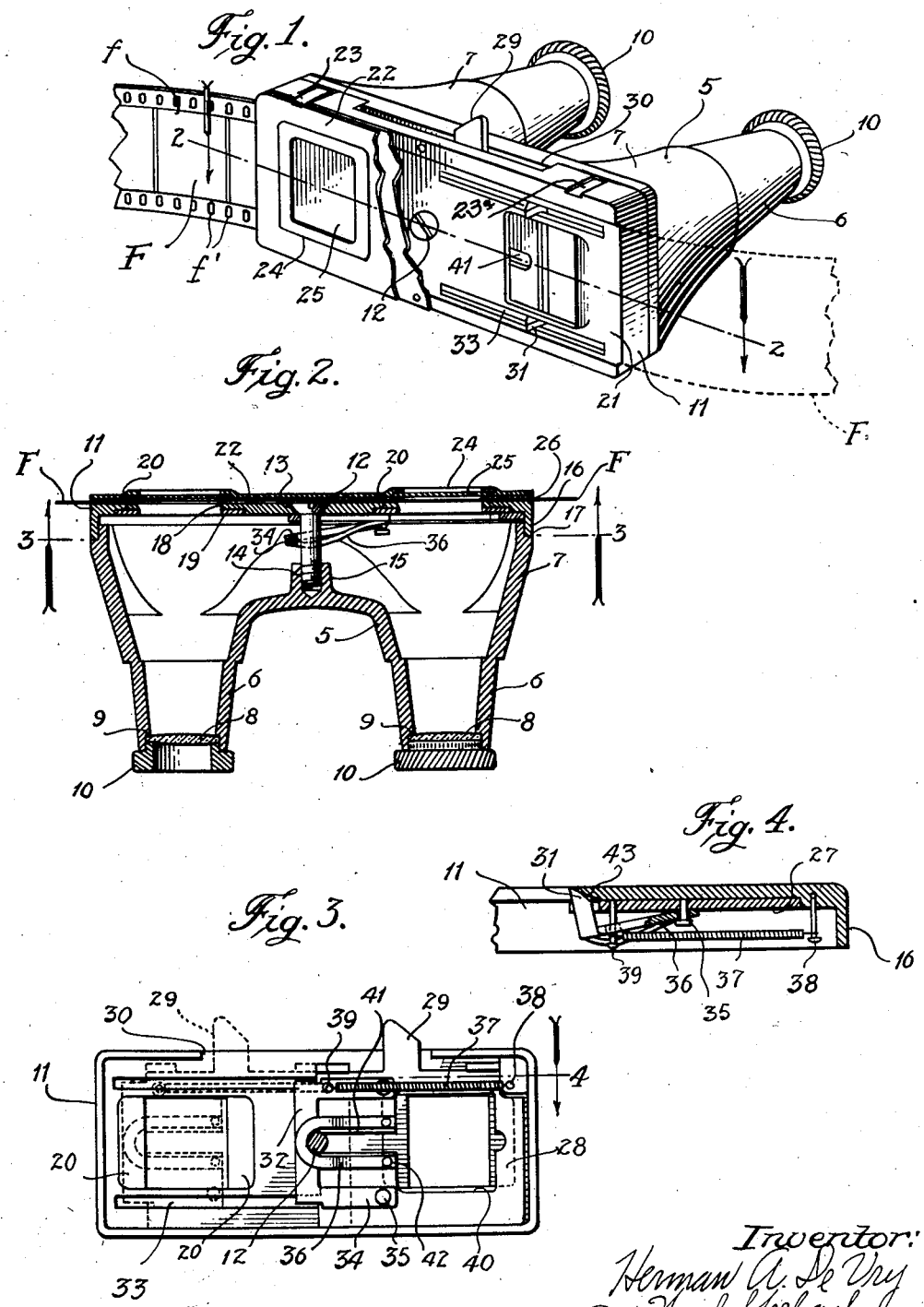

Patented June 4, 1935

2,003,480

UNITED STATES PATENT OFFICE 2,003,480

STEREOSCOPE

Herman A. de Vry, Chicago, Ill.

Application July 10, 1933, Serial No. 679,596

3 Claims. (Cl. 88—31)

The present invention relates generally to stereoscopes. More particularly, the invention relates to that type of stereoscope which is designed for use with a strip of motion picture type film having a longitudinal series of pairs of stereoscopic pictures thereon and comprises (1) a body which is hollow and embodies a pair of tubular, side-by-side, lens-equipped eye pieces, (2) a member which is connected to the body and is provided with means for holding the strip across the front of the body and in alignment with the eye pieces, and (3) mechanism which is associated with the member and operates upon manipulation thereof to feed the film across the front of the body so as to bring the pairs of pictures on the film successively into the range of the eye pieces.

One object of the invention is to provide a stereoscope of this type which is generally of new and improved construction and consists of but a small number of parts.

Another object of the invention is to provide a stereoscope of the type under consideration in which the film-holding member embodies a pair of laterally spaced picture apertures in direct alignment with the lenses of the eye pieces and the mechanism for feeding the film consists of a clutch device which is mounted on the back face of the plate for horizontal sliding movement, embodies a pair of vertically spaced, forwardly extending teeth for engagement with the longitudinal series of perforations along the side margins of the film and operates in response to sliding movement in one direction to feed the film so as to bring the pairs of pictures on the film successively into alignment with the apertures in the member for inspection through the eye pieces.

Another object of the invention is to provide a stereoscope of the last mentioned character in which the clutch device constituting the film-feeding mechanism embodies a finger piece whereby it may be slid back and forth for film-feeding purposes, and the vertically spaced, forwardly projecting teeth are arranged so that upon the return stroke of the clutch device they automatically disengage themselves from the perforations along the margins of the film.

A further object of the invention is to provide a stereoscope of the type and character under consideration in which the film-holding member is secured to the front end of the body by means of a screw and this screw is arranged so that it operates to limit horizontal sliding movement of the clutch device.

A still further object of the invention is to provide a stereoscope in which the clutch device is constructed and arranged so that at the end of each return stroke thereof, it is automatically shifted into an inoperative position in order to permit of insertion of the film into connected relation with the member or removal of the film from the member.

In addition, it is contemplated as one of the objects of the invention to provide a stereoscope which may be manufactured at a low and reasonable cost and in which the parts are arranged compactly.

Other objects of the invention and the various advantages and characteristics of the present stereoscope will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a perspective of a stereoscope embodying the invention, parts being broken away for illustrative purposes;

Figure 2 is a horizontal section taken on the line 2—2 of Figure 1 and illustrating in detail the construction of the body of the stereoscope and the manner in which the film-holding member is attached to the front end of the body;

Figure 3 is a vertical section taken on the line 3—3 of Figure 2 and illustrating the construction of the clutch device and the manner in which the device operates in response to sliding movement in one direction to feed the film so that the pairs of pictures thereon are brought successively into alignment or registry with the apertures in the film-holding member; and Figure 4 is a detailed section taken on the line 4—4 of Figure 3 and showing the arrangement and formation of the film-engaging teeth of the clutch device.

The stereoscope which forms the subject matter of the invention comprises a body 5 and is designed for use with a film F having a longitudinal series of pairs of stereoscopic pictures f thereon. The film, as shown in Figure 1 of the drawing, is in strip form and of motion picture type and embodies along the side margins thereof a pair of longitudinally extending series of perforations f'. The body 5 of the stereoscope is formed of any suitable composition material, such, for example, as "Bakelite". It is hollow and embodies a pair of tubular eye pieces 6 and a front part 7. The eye pieces 6 are arranged in side-by-side relation and are formed integrally with and project rearwardly from the front part 7 as shown in the drawing. Lenses 8 are mounted in the rear ends of the eye pieces and are held in place against shoulders 9 by means of circular retaining members 10. The latter, as shown in Figure 2 of the drawing, are pressed into connected relation with the rear ends of the eye pieces 6 and bear against the margins of the lenses. The circular retaining members 10 are adapted to be held in front of the eyes of the user of the stereoscope and because of the fact that they are circular, enable the user to look through the lenses 8 and the tubular eye pieces 6.

In addition to the body 5, the stereoscope comprises a member 11 for holding the film F across the front of the body. This member is rectangular and is preferably formed of the same material as the body. It fits across the front of the front part 7 of the body and is removably secured in place by means of a screw 12. The latter extends through a hole 13 in the center of the member 11 and fits in an internally threaded socket 14 in a boss 15 which is formed integrally with and projects forwardly from the portion of the front part 7 between the eye pieces 6. A flange 16 is formed integrally with and projects rearwardly from the margin of the film-holding member 11 and fits in a seat 17 around the outside of the front part 7 of the body. The screw 12 serves to draw the film-holding member 11 towards the body 5 and holds the flange 16 in place in the seat 17. The film-holding member 11 is provided with a pair of rectangular picture apertures 18. These apertures, as shown in the drawing, are aligned respectively with the eye pieces 6. The sides of the apertures are defined by means of vertically extending metal pieces 19 so that they are straight. These pieces, as shown in the drawing, fit and are secured within recesses 20 in the rear face of the film-holding member 11. The film F is adapted to be fed horizontally across the front face of the member 11 so as to bring the pairs of pictures f on the film successively into registry with the apertures 18 so that they may be viewed through the eye pieces 6 by the user of the stereoscope. The rear face of the member 11 is cut away or shaped to form a horizontal channel 21 for the film. This channel extends completely across the rear face of the member 11 and is adapted to have the strip of film fed therethrough as hereinafter described. The film is held within the channel by means of a rectangular, sheet metal plate 22. The latter is secured to the member 11 by four tongues 23 and has rectangular apertures 24 in direct alignment with and of the same size as the apertures 18 in the member 11. The tongues 23 are formed integrally with and extend rearwardly from the top and bottom edge portions of the plate 22 and fit in grooves 23ᵃ in the flange 16 of the member 11. The rear or free ends of the tongues are bent inwardly and engage the flange 16 yieldingly so as frictionally to hold the plate 22 in place. The apertures 24 serve to admit light to the pair of pictures in registry with the apertures 18 and have squares 25 of translucent material mounted therein so as to diffuse the light passing to the film. One end of the channel 21 is rounded as at 26 so as to permit of ready insertion of the film into the channel.

The film F is adapted to be fed step-by-step through the channel 24 in order successively to bring the pairs of pictures f into registry with the apertures 18 in the film-holding member 21, by means of a clutch device 27. This device is mounted adjacent the rear face of the film-holding member 11 and comprises a rectangular plate 28. The latter is preferably stamped from plate or sheet metal and is mounted for horizontal sliding movement against the rear face of the member 11. A finger piece 29 for use in sliding the plate 28 back and forth against the rear face of the film-holding member 11 is formed integrally with and projects upwardly from the top portion of the plate 28. This piece 29 extends through an elongated slot 30 in the top portion of the flange 16 and is adapted to be gripped or engaged by the finger. In addition to the plate 28, the clutch device 27 comprises a pair of vertically spaced, forwardly extending teeth 31. These teeth are formed integrally with the ends of a vertically extending bar 32 and project forwardly through horizontally extending, vertically spaced slots 33 in the film-holding member 11. The slots 33 are spaced apart the same distance as the series of perforations f' along the side margins of the film F and the teeth 31 extend through the slots into engagement with the perforations f'. The bar 32 embodies at the ends thereof a pair of horizontally extending arms 34 which are loosely mounted on studs 35 so that the bar 32 is free to swing or move to and from the plate 28. A leaf spring 36 is applied to the bar 32 so that the latter is pressed forwardly and the teeth are urged into interlocked relation with the perforations along the margins of the film. When the teeth are in interlocked relation or engagement with the film perforations and the plate 28 is slid horizontally in one direction, the film F is fed longitudinally through the channel 21. The teeth 33 have cam or beveled surfaces on one side thereof so that upon the return stroke of the plate 28, that is, upon shift of the plate in the opposite or reverse direction, they automatically become disengaged from the film and move rearwardly in the slots 33. Rearward movement of the teeth is permitted by virtue of the fact that the bar 32 is mounted so that it is movable to and from the plate 28. By sliding the plate 28 back and forth, the film is fed step-by-step through the channel 21 and the pairs of pictures f on the film are brought successively into registry with the apertures 18 in the film-holding member 11. A coil spring 37 extends between a pin 38 at one corner of the member 11 and a pin 39 on one of the arms 34 and operates to impart the return stroke to the plate 28. A rectangular aperture 40 is formed in the plate 28. This aperture is adapted to register with one of the apertures 18 in the film-holding member 11 when the plate 28 reaches the end of its return stroke. A horizontally extending slot 41 is formed in the central portion of the plate 28. This slot extends from the aperture 40 to the teeth-carrying bar 32 and receives the screw 12 for holding the film-holding member 11 in connected relation with respect to the body 5. The screw 12 operates to limit horizontal sliding movement of the plate 28 of the clutch device. The leaf spring 36 is U-shaped and the ends thereof are attached by rivets or studs 42 to the plate 28. The central or intermediate part of the spring is applied to the bar 32 and the legs or ends of the spring straddle the slot 41 as shown in Figure 3. The portions of the member 11 that define the inner ends of the teeth-receiving slots 33 are bevelled as at 43 to form stop shoulders which are adapted at the end of the return stroke of the clutch plate 28 to be engaged by the teeth 31 and to coact therewith so as wholly to retract them from the channel 21. In this position of the teeth, the film F may be either inserted into or threaded through the channel without interference from the teeth or pulled back through the channel for re-view.

The operation of the stereoscope is as follows:

The film F is first inserted into the channel 21 and then is fed forwardly a sufficient distance so that it is properly positioned for engagement by the clutch device 27. After insertion of the film within the channel 21, the clutch plate 28 is shifted for film-feeding purposes by way of the finger piece 29. When the pictures to be viewed, that is, the pictures of one pair are aligned with the apertures 18 in the film-holding member 11, the finger piece 29 is released with the result that the spring 27 returns the plate 28 to its normal position. During sliding movement of the plate 28 for film-feeding purposes, the teeth 31 are interlocked with the adjacent perforations along the side margins of the film F. Upon release of the clutch plate 28, the teeth become disengaged from the perforations and allow the strip to remain stationary in the channel 21. By manipulating the plate 28 with the finger piece 29, the film may be fed step-by-step through the channel and the pairs of pictures brought successively into registry with the apertures 18 for inspection through the eye pieces 6.

The herein described stereoscope consists of but a small number of parts and hence may be manufactured at a low and reasonable cost. It is simple in construction and the parts thereof are compactly arranged so that it is but small in size.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. As a new article of manufacture, a stereoscope adapted for use with a motion picture type film having a longitudinal series of pairs of stereoscopic pictures thereon and a longitudinal series of perforations along one of the margins thereof, and comprising a hollow body with an open front end and its rear end shaped to form a pair of side by side eye pieces; lenses in the eye pieces; a member connected to and closing the front end of the body and having a channel for holding the film across said front end of the body and in front of the eye pieces and a pair of apertures intersecting the channel and in alinement with the eye pieces, said member also having an elongated marginal notch adjacent the front end of the body and a slot adjacent the apertures; and a device for feeding the film through the channel comprising a plate mounted slidably between the member and the front end of the body and provided with an integral finger piece extending outwardly through the notch whereby it may be shifted back and forth from outside the body, and a forwardly extending spring pressed tooth carried by the plate so that it extends through and slides in the slot and is adapted for insertion in the perforations in the film, and having one side thereof substantially straight so that during shift of the plate in one direction it operates to feed the film through the channel so as to bring the pairs of pictures successively into registry with the apertures for view through the eye pieces, and having its other side cam-shaped so that upon the return stroke of the plate it automatically releases the film.

2. As a new article of manufacture, a stereoscope adapted for use with a motion picture type film having a longitudinal series of pairs of stereoscopic pictures thereon and a longitudinal series of perforations along one of the margins thereof, and comprising a hollow body with an open front end and its rear end shaped to form a pair of side by side eye pieces; lenses in the eye pieces; a member connected to and closing the front end of the body and having a channel for holding the film across said front end of the body and in front of the eye pieces and a pair of apertures intersecting the channel and in alinement with the eye pieces, said member also having a slot adjacent the apertures and an elongated marginal notch; a device for feeding the film through the channel comprising a plate mounted slidably against one face of the member and provided with finger piece extending outwardly through the notch whereby it may be shifted back and forth from outside the body, and a spring pressed tooth carried by the plate so that it extends through and slides in the slot and is adapted for insertion in the perforations in the film, and having one side thereof substantially straight so that during shift of the plate in one direction it feeds the film through the channel so as to bring the pairs of pictures successively into registry with the apertures for view through the eye pieces, and having its other side cam shaped so that upon the return stroke of the plate it automatically releases the film; and means at one end of the slot in the member forming a stop shoulder adapted to be engaged by the tooth at the end of the return stroke of the plate and to coact therewith to disengage the tooth from the film so that the latter is free to be moved manually back and forth in the channel.

3. As a new article of manufacture, a stereoscope adapted for use with a motion picture type film having a longitudinal series of pairs of stereoscopic pictures thereon and a longitudinal series of perforations along one of the margins thereof, and comprising a hollow body with an open front end and its rear end shaped to form a pair of side by side eye pieces; lenses in the eye pieces; a member connected to and closing the front end of the body and having a channel for holding the film across said front end of the body and in front of the eye pieces and also having a pair of apertures intersecting the channel and in alinement with the eye pieces and a slot adjacent the apertures; a device for feeding the film through the channel comprising a plate mounted slidably between the member and the front end of the body and provided with a finger piece extending outwardly through an elongated notch between the member and said front end of the body whereby it may be shifted back and forth from outside the body, and a forwardly extending spring pressed tooth carried by the plate so that it extends through and slides in the slot and is adapted for insertion in the perforations in the film, and having one side thereof substantially straight so that during shift of the plate in one direction it feeds the film through the channel so as to bring the pairs of pictures successively into registry with the apertures for view through the eye pieces, and its other side cam shaped so that upon the return stroke of the plate it automatically releases the film; means at one end of the slot in the member forming a stop shoulder adapted to be engaged by the tooth at the end of the return stroke of the plate and to co-act therewith to disengage the tooth from the film so that the latter is free to be moved manually back and forth in the channel; and a coil spring for imparting the return stroke to the plate having one end thereof anchored to the member and its other end attached to the plate.

HERMAN A. DE VRY.